United States Patent
Dubovik

(10) Patent No.: US 9,158,380 B2
(45) Date of Patent: Oct. 13, 2015

(54) IDENTIFYING A 3-D MOTION ON 2-D PLANES

(75) Inventor: Gleb Dubovik, San Francisco, CA (US)

(73) Assignee: NET POWER AND LIGHT, INC., San Francisco, CA (US)

( * ) Notice: Subject to any disclaimer, the term of this patent is extended or adjusted under 35 U.S.C. 154(b) by 62 days.

(21) Appl. No.: 13/544,930

(22) Filed: Jul. 9, 2012

(65) Prior Publication Data

US 2014/0009256 A1 Jan. 9, 2014

(51) Int. Cl.
| | | |
|---|---|---|
| *G06F 3/0346* | (2013.01) | |
| *G06F 3/01* | (2006.01) | |
| *G06F 3/0354* | (2013.01) | |
| *G06F 3/0481* | (2013.01) | |
| *G06F 3/0482* | (2013.01) | |

(52) U.S. Cl.
CPC .............. *G06F 3/017* (2013.01); *G06F 3/0346* (2013.01); *G06F 3/0354* (2013.01); *G06F 3/0482* (2013.01); *G06F 3/04815* (2013.01)

(58) Field of Classification Search
CPC ............ G09G 5/00; G09G 5/08; G06F 3/033; G06F 3/041; G06F 3/044; G06F 3/042; G06F 3/0346; G06F 3/0354; G06F 3/0362; G06F 3/04815; G06F 3/0482; G06F 3/0485; G06F 3/0486; G06F 3/017
See application file for complete search history.

(56) References Cited

U.S. PATENT DOCUMENTS

| | | | | |
|---|---|---|---|---|
| 2009/0303204 | A1* | 12/2009 | Nasiri et al. | 345/184 |
| 2011/0148875 | A1* | 6/2011 | Kim et al. | 345/420 |
| 2012/0038549 | A1* | 2/2012 | Mandella et al. | 345/156 |
| 2012/0075177 | A1* | 3/2012 | Jacobsen et al. | 345/156 |
| 2012/0108329 | A1* | 5/2012 | Ashida et al. | 463/31 |
| 2012/0208639 | A1* | 8/2012 | Reynolds et al. | 463/36 |
| 2012/0256835 | A1* | 10/2012 | Musick et al. | 345/161 |
| 2012/0309412 | A1* | 12/2012 | MacGougan et al. | 455/456.1 |
| 2013/0044913 | A1* | 2/2013 | Jin et al. | 382/103 |
| 2013/0141464 | A1* | 6/2013 | Hunt et al. | 345/659 |

* cited by examiner

*Primary Examiner* — Kent Chang
*Assistant Examiner* — Sujit Shah
(74) *Attorney, Agent, or Firm* — Perkins Coie LLP

(57) ABSTRACT

Systems and methods for recognizing 3-D human motions are described. In some embodiments, the present disclosure contemplates a variety of methods and systems for recognizing a 3-D motion on 2-D planes. The 3-D human motions may include, but is not limited to, kinematic based gestures, such as clapping, spell casting, security gestures, etc.

21 Claims, 4 Drawing Sheets

IDENTIFYING A 3-D MOTION ON 2-D PLANES

TECHNICAL FIELD

The present disclosure relates to the use of 3-D motions to facilitate a human-computer interface.

BACKGROUND

Using gestures as a means for interfacing with portable devices is becoming commonplace. For example, current Android® based phones can control access through sensing and accepting security gestures in place of alphanumeric passwords. Such gestures are typically recognized by analyzing kinematic (motion related) data provided by sensors found in the portable device. Kinematic sensors include accelerometers, gyroscopes, magnetometers, etc.

However, human motions are usually irregular and in 3-D. Many existing methods of identifying 3-D motions require complex computations and integrations of 3-D data from multiple accelerometers or other motion sensors, which not only consume a large amount of CPU time but can lead to a higher margin of error.

In consequence, the present inventors have recognized that there is value and need in providing a method and system for recognizing 3-D motions on 2-D planes, which only require minimized computations and integrations.

BRIEF DESCRIPTION OF DRAWINGS

These and other objects, features, and characteristics of the present disclosure will become more apparent to those skilled in the art from a study of the following detailed description in conjunction with the appended claims and drawings, all of which form a part of this specification. In the drawings:

DETAILED DESCRIPTION

Figure 1:
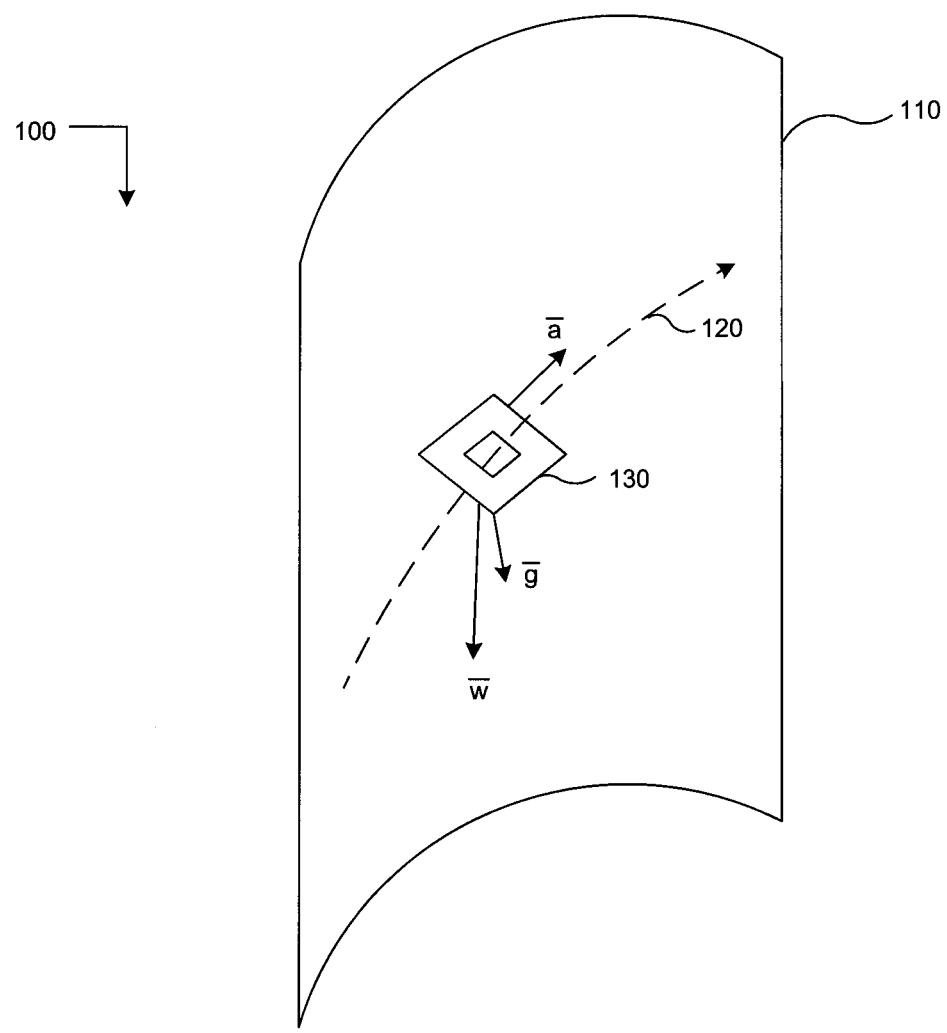
FIG. 1 illustrates an example of a local 2-D plane tangent to trajectories of a 3-D motion in accordance with one embodiment of the present disclosure.

The following description and drawings are illustrative and are not to be construed as limiting. Numerous specific details are described to provide a thorough understanding of the disclosure. However, in certain instances, well-known details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described that may be requirements for some embodiments but not other embodiments.

The terms used in this specification generally have their ordinary meanings in the art, within the context of the disclosure, and in the specific context where each term is used. Certain terms that are used to describe the disclosure are discussed below or elsewhere in the specification to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods, and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Systems and methods for recognizing 3-D human motions are described. In some embodiments, the present disclosure contemplates a variety of methods and systems for recognizing a 3-D motion on 2-D planes. The 3-D human motions may include, but is not limited to, kinematic based gestures, such as clapping, spell casting, security gestures, etc.

In some embodiments, a system for recognizing 3-D human motions may include a portable device, which may include one or more accelerometers and one or more gyroscopes. The portable device may include, for example, a device such as a remote controller, a personal digital assistant (PDA), a cellular telephone, an iPhone®, an Android® phone, an iPad®, other tablet devices, etc. The one or more accelerometers may be operable to obtain linear acceleration motion data and absolute degree angle data of the portable device in reference to the gravity at a specific time. The linear acceleration data may include a linear acceleration vector in reference to the gravity. The one or more gyroscopes may be operable to obtain relative angular rotation data of the portable device at the specific time. The angular rotation data may include an angular velocity vector. In some implementations, the one or more accelerometer may include a 3-axis accelerometer. The one or more gyroscopes may include a 3-axis gyroscope. The portable device may be configured to determine a 2-D local plane at a specific time according to the linear acceleration vector and the angular velocity vector. The portable device may be further configured to analyze kinematic data from the one or more accelerometers and the one or more gyroscopes on the local 2-D plane. By analyzing sensor data profiles on a series of 2-D local planes separated by a fixed time interval, better and simpler 3-D motion recognition can be accomplished for a variety of human motions.

Some embodiments may provide a portable device, two or more kinematic sensors and/or one or more non-kinematic sensors. Data from the two or more kinematic sensors and/or the one or more non-kinematic sensors may be obtained and analyzed to identify or recognize a 3-D motion. In some embodiments, the two or more kinematic sensors may include sensors, such as one or more accelerators, one or more gyroscopes, one or more magnetometers, etc. The one or more non-kinematic sensors may include sensors, such as an audio input device, one or more cameras, a pressure sensor, a barometer, a proximity sensor, etc. In some implementations, a 3-D motion may be identified by analyzing data from the kinematic sensors on 2-D local planes separated by a fixed time interval and data from non-kinematic sensors. In some implementations, a 3-D motion may be identified by only analyzing data from the kinematic sensors on 2-D local planes separated by a fixed time interval.

In some embodiments, the relative angular rotation data includes relative degree of rotation data on roll axis, pitch axis, and yaw axis. In some implementations, absolute yaw rotation of the portable device to a fixed direction may be obtained by the one or more magnetometers. In some implementations, the relative angular rotation data may be obtained by multiple depth cameras.

In some embodiments, a system for recognizing an operator's 3-D motions may be configured to analyze the 3-D motions according to at least multiple distinct inputs of 3-D motions from the operator. In some implementations, the multiple distinct inputs may include predefined 3-D motions that are unlikely to be made unintentionally. In some implementations, a pattern of 3-D motions from an operator may be generated and dynamically constructed or expanded according to predefined machine learning algorithms. For example, the operator's 3-D motions may be analyzed over time and added to the pattern of 3-D motions from the operator. In some embodiments, the system may be configured to allow an operator to adjust the sensitivity of 3-D motion recognition functions provided to the operator. In some embodiments, the system may be configured to provide an operator of the portable device a set of predetermined functions of 3-D motion recognition sensitivity according to the operator's physical characteristics. In some embodiments, the system may be configured to allow an operator to disable the 3-D motion recognition functions.

Some embodiments may provide methods instantiated on a portable device and/or a local device. In some implementations, methods may be distributed across local devices and remote devices in the cloud computing service.

FIG. 1 illustrates an example of a local 2-D plane tangent to trajectories of a 3-D motion in accordance with one embodiment of the present disclosure. Human motions, in general, are in 3-D. However, at a specific time, a human 3-D motion may be defined by a 2-D local plane 130 that is tangent to a trajectory 120 of the 3-D motion. Kinematic data of a series of 2-D local planes with a fixed time interval may provide a good representation of the 3-D motion.

In some embodiments, a 2-D local plane at a specific time may be defined by a linear acceleration vector in reference to the gravity and an angular velocity vector of the 3-D motion. In some implementations, the linear acceleration vector in reference to the gravity may be obtained by one or more accelerometers. The angular velocity vector may be obtained by one or more gyroscopes or multiple depth cameras. The one or more gyroscopes may include a 3-axis gyroscope. The angular velocity vector may include relative degree of rotation data on roll axis, pitch axis, and yaw axis.

Figure 2:
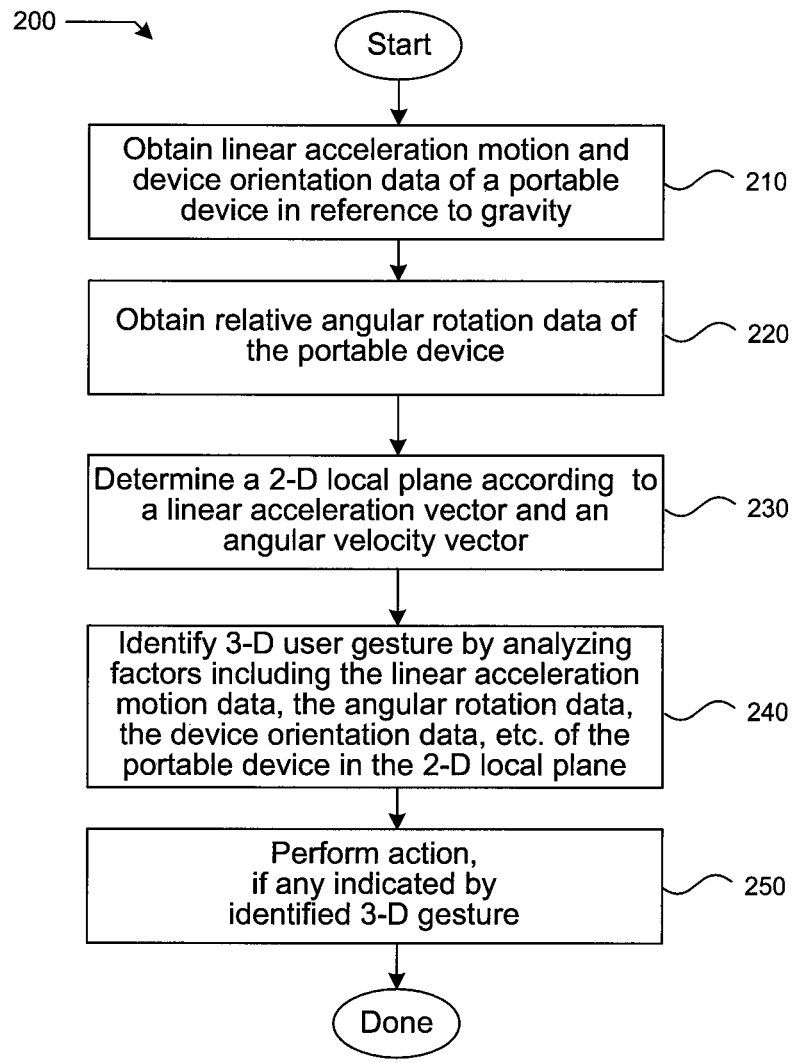
FIG. 2 illustrates a flow chart showing a set of exemplary operations that may be used in accordance with another embodiment of the present disclosure.

FIG. 2 illustrates a flow chart showing a set of exemplary operations 200 for identifying a 3-D motion, in accordance with embodiments of the present disclosure. At step 210, linear acceleration motion data and device orientation data of a portable device in reference to the gravity may be obtained. The portable device may be, for example, any portable device, such as a wireless controller, a personal digital assistant (PDA), a smart phone, a tablet, a Window/Mac laptop, a Linux machine, a netbook, a cloudbook, a media player, etc. The linear acceleration motion data and the device orientation data, including a linear acceleration vector, of the portable device in reference to the gravity may be sensed by one or more accelerometers of the portable device. The one or more accelerometers may include a 3-axis accelerometer.

At step 220, relative angular rotation data of the portable device may be obtained. In some embodiments, the relative angular rotation data, including an angular velocity vector, may be obtained by one or more gyroscopes or multiple depth cameras. The one or more gyroscopes may include a 3-axis gyroscope. In some implementations, the portable device may include one or more magnetometers to obtain absolute yaw rotation of the portable device relative to a fixed direction.

At step 230, a 2-D local plane tangent to trajectories of the 3-D motion may be determined according to the linear acceleration vector and the angular velocity vector. As will be appreciated by one of ordinary skill in the art, many different schemes may be deployed in determining the 2-D local plane. In some embodiments, a 2-D local plane may be determined according to obtained data, such as relative angular rotation data, acceleration motion data, device orientation data, and/or the direction of gravity. In some implementations, different schemes may be applied to determine a 2-D local plane of a 3-D motion depending on characteristics of gestures associated with the 3-D motion.

In some embodiments, the relative angular rotation data, the acceleration motion data and the device orientation data may be obtained by averaging and/or integrating data from two or more kinematic sensors of the portable device. In some implementations, the relative angular rotation data, the acceleration motion data and the device orientation data may be provided by one or more application programs executed on the portable device.

When the 2-D local plane is determined, the 3-D motion of the portable device may be identified by analyzing kinematic data (e.g., linear acceleration motion data, device orientation data, relative angular data, gravity, etc.) of the portable device on a series of 2-D planes. Two adjacent 2-D planes are separated by a fixed time interval. In some embodiments, the fixed time interval may be defined by the default sampling interval of the portable device (e.g., an iPhone®, an Android® phone, etc.).

By way of example, but not limitation, the 3-D motion may be more readily distinguished by also analyzing non-kinematic data (e.g., audio data from an audio input device, etc.). The operator of the portable device may make a sound during the 3-D motion. The non-kinematic data may be useful in determining whether the operator intended the 3-D motion, and if so, identify the 3-D motion. In some embodiments, the kinematic data and non-kinematic data may be normalized and compared with multiple distinct inputs of 3-D motions from the operator. In some implementations, the multiple distinct inputs may include predefined 3-D motions that are unlikely to be made unintentionally. In some embodiments, a pattern of 3-D motions from an operator may be generated and dynamically constructed or expanded according to pre-defined machine learning algorithms. When a specific gesture can be identified, a step 250 may initiate or implement any action indicated by the specific identified 3-D motion.

As will be appreciated by one of ordinary skill in the art, the set of exemplary operations 200 for identifying a 3-D motion may be instantiated locally (e.g. on the portable device or a local device), and may be distributed across a system including a portable device and one or more other computing devices. For example, the operations 200 may determine that the available computing power of the portable device is insufficient, or additional computer power is needed, and may offload certain aspects of the method to the cloud.

Figure 3:
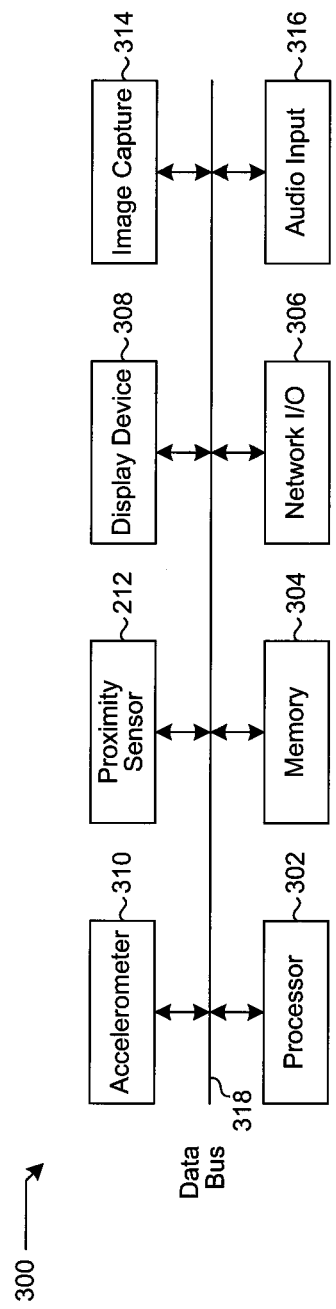
FIG. 3 illustrates an exemplary portable device according to yet another embodiment of the present disclosure.

FIG. 3 illustrates an exemplary portable device 300 in accordance with yet another embodiment of the present disclosure. The architecture and components of the portable device 300 are merely illustrative. Those skilled in the art will immediately recognize the wide variety of suitable categories and specific devices, such as a cell phone, an iPad©, an iPhone©, a wireless controller, a personal digital assistant (PDA), a smart phone, a tablet, etc. In this simplified example, the portable device 300 includes a processor 302, a memory 304, a network I/O device 306, a display device 308, and a plurality of sensors, such as kinematic sensors (e.g., accelerometer 310, etc.) and non-kinematic sensors (e.g., a proximity sensor 312, an image capture device 314, an audio input device 316, etc.), all in communication via a data bus 318. The processor 302 may include one or more of a central processing unit (CPU) and a graphics processing unit (GPU). The memory 304 may include a random access memory (RAM) or other dynamic storage device for storing information, i.e. operator gesture patterns and programs/instructions to be executed by the processor 302. The memory 304 may be used for storing temporary variables or other intermediate information during execution of programs/instructions by the processor 302. The memory 304 may also include a read only memory (ROM) and/or other static storage device for storing static information and programs/instructions for the processor 302. The memory 304 may further include a mass storage device, such as a magnetic disk or optical disc and its corresponding drive for storing information, i.e. operator gesture patterns and instructions.

The programs/instructions stored in the memory 304, when executed by the processor 302, may cause the processor 302 to perform certain operations. In some embodiments, the operations may include, but are not limited to: obtaining linear acceleration motion data and absolute degree angle data of the portable device in reference to gravity at a particular time, the linear acceleration motion data including a linear acceleration vector in reference to the gravity; obtaining relative angular rotation data of the portable device at the particular time, the angular rotation data including an angular velocity vector; determining a 2-D local plane according to the linear acceleration vector and the angular velocity vector at the particular time; and, identifying the 3-D motion by analyzing the linear acceleration motion data, the absolute degree angle data, and the relative angular rotation data on the 2-D local plane.

Figure 4:
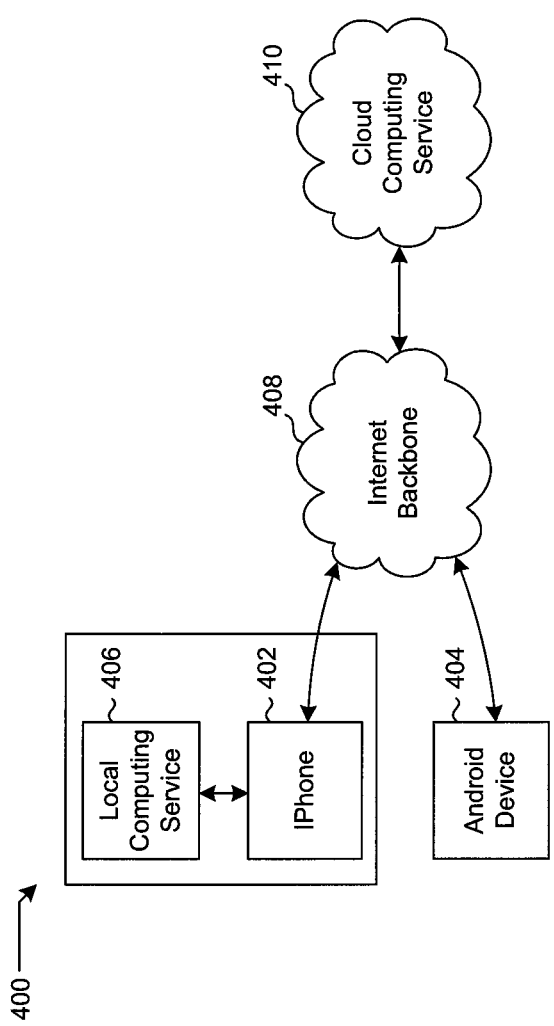
FIG. 4 illustrates an exemplary system according to yet another embodiment of the present disclosure.

FIG. 4 illustrates an exemplary system 400 suitable for identifying a 3-D motion of an operator. The system 400 may include a plurality of portable devices, such as an iPhone® 402, an Android® device 404, a local computing device 406, and an Internet connection coupling the portable devices to a cloud computing service 410. In some embodiments, 3-D motion recognition functionality and/or 3-D motion patterns may be provided at cloud computing service 410 and be available to both portable devices, as the application requires.

In general, the routines executed to implement the embodiments of the disclosure may be implemented as part of an operating system or a specific application, component, program, object, module or sequence of instructions referred to as "programs." The programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, various embodiments are capable of being distributed as a program product in a variety of forms, and that the disclosure applies equally regardless of the particular type of computer-readable medium used to actually affect the distribution.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for the disclosure, are described above for illustrative purposes, various equivalent modifications are possible within the scope of the disclosure, as those skilled in the relevant art will recognize. For example, while processes or blocks are presented in a given order, alternative embodiments may perform routines having steps or employ systems having blocks in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples—alternative implementations may employ differing values or ranges.

The teaching of the disclosure provided herein can be applied to other systems, not necessarily only the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed is:

1. A computer-implemented method for recognizing a specific gesture based on a 3-D motion of a portable device, the computer-implemented method comprising:
    obtaining linear acceleration motion data and device orientation data of the portable device in reference to gravity at a plurality of times at fixed interval, the linear acceleration motion data including a linear acceleration vector in reference to the gravity;
    wherein the linear acceleration motion data and the device orientation data in reference to the gravity are obtained by one or more accelerometers associated with the portable device;
    obtaining relative angular rotation data of the portable device at the plurality of times, the angular rotation data including an angular velocity vector;
    wherein the relative angular rotation data is obtained by one or more gyroscopes, or multiple depth cameras associated with the portable device;
    defining a plurality of 2-D local planes at each of the plurality of times according to the linear acceleration vector, and the angular velocity vector obtained at each of the respective plurality of times;
    analyzing 2-D kinematic data associated with the motion of the portable device on each of the plurality of defined 2-D local planes, the 2-D kinematic data obtained via the one or more accelerometers and the one or more gyroscopes or multiple depth cameras;
    obtaining non-kinematic data of the portable device, the non-kinematic data including audio data from an audio input device associated with the portable device;
    wherein the audio data is indicative of a predefined gesture;
    identifying the 3-D motion by comparing the 2-D kinematic data associated with the motion of the portable device in one or more of the plurality of 2-D local planes;
    identifying the specific gesture by analyzing the identified 3-D motion and the non-kinematic data of the portable device; and
    performing or initiating a predefined action indicated by the identified specific gesture.

2. The computer-implemented method as recited in claim 1, wherein the one or more accelerometers include a 3-axis accelerometer.

3. The computer-implemented method as recited in claim 1, wherein the relative angular rotation data includes relative degree of rotation data on roll axis, pitch axis, and yaw axis.

4. The computer-implemented method as recited in claim 3, wherein the one or more gyroscopes include a 3-axis gyroscope.

5. The computer-implemented method as recited in claim 3, wherein the portable device further includes one or more magnetometer, the one or more magnetometer configured to obtain absolute yaw rotation of the portable device to a fixed direction.

6. The computer-implemented method as recited in claim 1, further comprising: generating a 3-D motion pattern of an operator of the portable device according to multiple distinct inputs of 3-D motions from the operator.

7. The computer-implemented method as recited in claim 6, wherein the 3-D motion pattern is dynamically constructed or expanded by analyzing the operator's 3-D motion pattern over time using predefined machine learning algorithms.

8. The computer-implemented method as recited in claim 7, further comprising: storing the operator's 3-D motion pattern on the portable device, other computing devices of the operator, and/or a cloud computing service.

9. The computer-implemented method as recited in claim 1, further comprising: providing an operator of the portable device a set of predetermined functions of 3-D motion recognition sensitivity according to the operator's physical characteristics.

10. The computer-implemented method as recited in claim 9, wherein the portable device includes the audio input device.

11. The computer-implemented method as recited in claim 1, wherein the portable device is a wireless controller, a personal digital assistant (PDA), a smart phone, a tablet, a Window/Mac laptop, a Linux machine, a netbook, a cloudbook, or a media player.

12. A system for recognizing a specific gesture based on a 3-D motion, the system comprising:
    a portable device, the portable device including:
        one or more processors;
        one or more accelerometers;
        one or more gyroscopes;
        one or more audio input devices; and
        one or more memory units with instructions stored thereon, which when executed by the one or more processors cause the system to:
            obtain linear acceleration motion data and device orientation data of the portable device in reference to gravity at a plurality of times at fixed interval, the linear acceleration motion data including a linear acceleration vector in reference to the gravity;
            wherein the linear acceleration motion data and the device orientation data in reference to the gravity are obtained by the one or more accelerometers;
            obtain relative angular rotation data of the portable device, the angular rotation data including an angular velocity vector;
            wherein the relative angular rotation data is obtained by the one or more gyroscopes;
            define a plurality of 2-D local planes at each of the plurality of times according to the linear acceleration vector and the angular velocity vector;
            analyze 2-D kinematic data associated with the motion of the portable device on each of the plurality of defined 2-D local planes, the 2-D kinematic data obtained via the one or more accelerometers and the one or more gyroscopes;

obtain non-kinematic data of the portable device, the non-kinematic data including audio data from the one or more audio input device associated with the portable device;

wherein, the audio input data is indicative of a predefined gesture;

identify the 3-D motion by comparing the 2-D kinematic data associated with the motion of the portable device in one or more of the plurality of 2-D local planes;

identify the specific gesture by analyzing the identified 3-D motion and the kinematic data of the portable device; and perform or initiate a predefined action indicated by the identified specific gesture.

13. The system as recited in claim 12, wherein the one or more accelerometers include a 3-axis accelerometer.

14. The system as recited in claim 12, wherein the relative angular rotation data includes relative degree of rotation data on roll axis, pitch axis, and yaw axis.

15. The system as recited in claim 14, wherein the one or more gyroscopes include a 3-axis gyroscope.

16. The system as recited in claim 14, wherein the portable device further includes one or more magnetometer, the one or more magnetometer configured to obtain absolute yaw rotation of the portable device to a fixed direction.

17. The system as recited in claim 12, wherein the one or more memory units have further instructions stored thereon, which when executed by the one or more processors cause the system to further: generate a 3-D motion pattern of an operator of the portable device according to multiple distinct inputs of 3-D motions from the operator.

18. The system as recited in claim 17, wherein the 3-D motion pattern is dynamically constructed or expanded by analyzing the operator's 3-D motion pattern over time using predefined machine learning algorithms.

19. The system as recited in claim 18, wherein the one or more memory units have further instructions stored thereon, which when executed by the one or more processors cause the system to further: store the operator's 3-D motion pattern on the portable device, other computing devices of the operator, and/or a cloud computing service.

20. The system as recited in claim 12, wherein the one or more memory units have further instructions stored thereon, which when executed by the one or more processors cause the system to further: provide an operator of the portable device a set of predetermined functions of 3-D motion recognition sensitivity according to the operator's physical characteristics.

21. The system for recognizing a specific gesture based on a 3-D motion as recited in claim 12, wherein the portable device is a wireless controller, a personal digital assistant (PDA), a smart phone, a tablet, or a laptop.

* * * * *